Jan. 17, 1928.

P. E. NORRIS 1,656,753

STORAGE BATTERY

Filed Nov. 17, 1924

INVENTOR:
P. E. Norris,
BY A. L. Venall
His ATTORNEY

Patented Jan. 17, 1928.

1,656,753

UNITED STATES PATENT OFFICE.

PAUL E. NORRIS, OF WILKINSBURG, PENNSYLVANIA, ASSIGNOR TO WESTINGHOUSE UNION BATTERY COMPANY, OF SWISSVALE, PENNSYLVANIA, A CORPORATION OF PENNSYLVANIA.

STORAGE BATTERY.

Application filed November 17, 1924. Serial No. 750,316.

My invention relates to storage batteries.

I will describe one form of storage battery embodying my invention, and will then point out the novel features thereof in claims.

Figure 1:
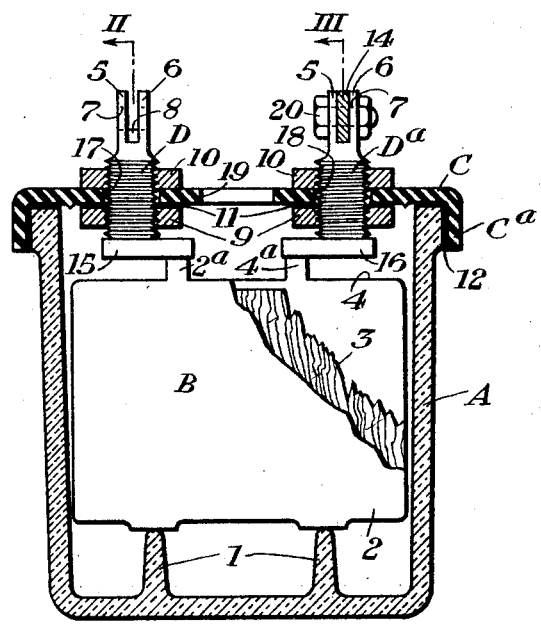
Figure 2:
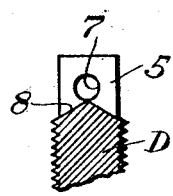
Figure 3:
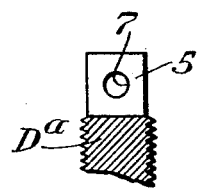
Figure 4:
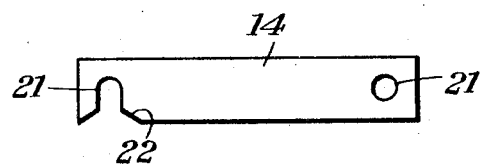

In the accompanying drawing, Fig. 1 is a vertical transverse sectional view showing one form of storage battery embodying my invention. Figs. 2 and 3 are detail sectional views along the lines II and III, respectively of Fig. 1, illustrating the shapes of the terminal posts. Fig. 4 is a view showing, in front elevation, one form of connecting link suitable for use with the storage battery illustrated in Fig. 1 and also embodying my invention.

Similar reference characters refer to similar parts in each of the several views.

Referring first to Fig. 1, the battery comprises a jar A of insulating material such as moulded glass. The bottom of this jar is provided with integral upstanding plate rests 1 of the usual and well known form. Supported on plate rests 1 in jar A is a battery element B comprising, as usual, a series of alternately disposed negative plates 2 and positive plates 4, with a separator 3 interposed between each two adjacent plates. Each negative plate is provided with a plate lug 2$^a$ and all such negative plate lugs are connected with a strap 15 having thereon a negative terminal post D projecting upwardly from the top of the jar. In similar manner each positive plate 4 is provided with a plate lug 4$^a$, which lugs are connected with a strap 16 having a positive terminal post D$^a$, projecting upwardly therefrom.

The top of the jar A is closed by a cover C of insulating material such as hard rubber. As here shown this cover is substantially flat with a dependent flange C$^a$ at its edges which flange fits around the top of jar A and is secured thereto by means of sealing compound 12.

The cover C is provided with an opening 19 for filling the battery with electrolyte and to permit the escape of generated gases. The top C is also provided with two spaced holes 17 and 18 adapted to receive posts D and D$^a$ respectively. In order to prevent acid creepage and leakage from splashing, it is desirable to completely seal the joint where each terminal post passes through the top cover C. It is also desirable that the posts should be rigidly secured to the cover to assist in holding the battery element immovably in place should the battery be subjected to vibration.

To accomplish these results I thread the outer surface of each post D and D$^a$, and provide each post with two threaded nuts 9 and 10. Referring for example, to post D, one nut, 9, is threaded on post D below cover C, and a resilient washer 11, preferably of soft rubber, is clamped between this nut and the cover. The other nut 10 is threaded on the post D on top of the cover. It will be plain from Fig. 1, that by drawing up on the nuts, the post is clamped tightly to the cover. The washer 11 serves two purposes, first to seal the joint between the cover and the post to prevent leakage of electrolyte, and second, to absorb mechanical shock.

One advantage of my invention is that considerable adjustment is possible between the cover C and the posts D and D$^a$. In commercial moulding of jars similar to jar A there is considerable variation in the dimensions of the jars. For example, the distance between the top of the plate rests and the top of the jar may vary between wide limits in different jars. The height of the battery element is also variable. The exact relative positions of the cover C and posts D, D$^a$, is, then, different for different batteries but with my invention this variation may be compensated for by simply screwing the nuts 9 and 10 up or down on the threaded terminal posts as required.

For connecting together separate cells of batteries embodying my invention, I provide the top of each post with two upstanding ears 5 and 6 separated by a slot. A link 14 is adapted to connect the positive post of one battery with the negative post of an adjacent cell, the ends of the link being inserted in the slots of the proper terminal posts and clamped in place by means of a screw 20 passing through holes 7 in the ears 5 and 6 of the post and a hole 21 in the link.

It is undesirable to connect together the negative terminal posts of separate batteries, and to prevent this occurrence, I provide each negative post D with a wedge shaped projection 8 extending partially into the slot between ears 5 and 6 as best shown in Fig. 2. One end of each link 14 is also provided with a triangular notch 22 adapted to receive one of these projections 8. The bottom of the slot between the ears 5 and 6 of each positive terminal post D is square, and it follows that only one end of each link can be connected with a negative terminal post and that improper connection of the battery is thus made impossible.

Wherever, in the accompanying specification and claims, I have used the term moulded as referring to the battery jar, it should be construed to mean mechanically or manually formed by either pressing or blowing.

Although I have herein shown and described only one form of storage battery embodying my invention, it is understood that various changes and modifications may be made therein within the scope of the appended claims without departing from the spirit and scope of my invention.

Having thus described my invention, what I claim is:

1. A storage battery having a positive and a negative terminal post each provided with a slot, a wedge shaped shoulder extending into the slot in the negative post, and a link for connecting one post with the post of opposite polarity in an adjoining battery, said link having one end adapted to enter the slot in the positive post and the other end provided with a triangular notch to receive said shoulder when such other end enters the slot in the negative post.

2. A storage battery having a positive and a negative terminal post each provided with a slot, a wedge shaped shoulder extending into the slot in one post but not in the other, and a link for connecting one of said posts with the post of opposite polarity in an adjoining battery, said link having one end adapted to enter the slot in the post which does not have the shoulder, and the other end of said link being provided with a triangular notch to receive the shoulder in the slot on the other post.

In testimony whereof I affix my signature.

PAUL E. NORRIS.